United States Patent Office 3,119,665
Patented Jan. 28, 1964

3,119,665
PRODUCTION OF CALCIUM SUPEROXIDE
Joseph S. Hashman, Evans City, Jackie C. Renforth, Valencia, and Jerry W. Berkstresser, Carlisle, Pa., assignors to Callery Chemical Company, Pittsburgh, Pa., a corporation of Pennsylvania
No Drawing. Filed May 31, 1960, Ser. No. 32,579
8 Claims. (Cl. 23—187)

This invention relates to a new and improved method for producing calcium superoxide, $Ca(O_2)_2$.

The superoxides in general are compounds rich in oxygen and having high oxidizing power. Such compounds are useful as oxygen sources in self-contained breathing apparatus and for other purposes in which their oxygen content provides advantageous utility. Calcium superoxide has generally the properties attributable to the superoxides as a class, and has found particular application in the passivation of iron and steel, wherein it is used to produce uniform coatings having improved rust-inhibiting characteristics.

One method by which calcium superoxide has been prepared involves the oxidation of calcium peroxide by reaction with hydrogen peroxide, but this process has not achieved any importance because it is very expensive and difficult to carry out. Another method by which calcium superoxide has been made is by heating the peroxide with oxygen in the presence of a complex platinum-containing catalyst. This method, however, requires temperatures of over 500° C. and high superatmospheric pressures. Thus, it presents considerable difficulty in commercial operation and even on a small scale requires cumbersome and expensive equipment.

It is an object of this invention to provide a novel, efficient and economical method for the production of calcium superoxide, which provides improved operation over those methods known heretofore.

Another object is to provide an easily carried out process by which calcium superoxide can be produced in simple, readily available equipment and with a minimum of capital investment.

Other objects will become apparent from time to time throughout the following specification and claims.

The basis for this invention is our discovery that a calcium halide reacts with an alkali metal or tetra(lower alkyl)ammonium superoxide to produce calcium superoxide, $Ca(O_2)_2$. No particular conditions of temperature or pressure are necessary to the operability of our method. Using the reaction of calcium chloride with potassium superoxide as an example, the reaction takes place in accordance with the following equation:

$$2KO_2 + CaCl_2 \rightarrow Ca(O_2)_2 + 2KCl$$

The superoxides which are usable in the process described above correspond to the empirical formula $MO_2$ where M is an alkali metal, such as sodium or potassium, or a tetra(lower alkyl)ammonium radical, such as tetramethylammonia, $(CH_3)_4N^+$, or tetraethylammonium, .

Calcium halides in general may be used in the practice of our invention. Particularly efficacious are calcium chloride and calcium bromide, which produce more efficient reaction with generally fewer undesirable side reactions.

Because the process involves the reaction of two solid compounds, it is desirable to provide intimate mixing of the reactants in order to optimize the rate of the reaction and the yield obtained. Preferably a means of abrasively mixing the reactants is used. For example, on a laboratory scale a mortar and pestle can be used to produce the desired abrasive mixing action. On a larger scale, a ball mill reactor or similar type of grinding or mixing equipment can be used to provide the preferred abrasive mixing of the reactants.

In one example of the method and practice of our invention, potassium superoxide was mixed in a mortar and pestle with an excess of calcium chloride based on the equation above. After twenty minutes reaction time, the mixture was analyzed by X-ray and chemical analyses. The analyses showed that calcium superoxide, $Ca(O_2)_2$, was produced during the reaction, along with potassium chloride. No potassium superoxide remained unreacted and only a small amount of calcium chloride was found. The product was analyzed for superoxide oxygen using the conventional method of reacting the compound with glacial acetic acid and diethylphthalate at 0° and measuring the evolved oxygen.

In these and other tests the general applicability of the method was demonstrated and it was shown that the calcium superoxide thus produced is obtained in good yield and in a desirable form.

According to the provisions of the patent statutes, we have explained the principle and mode of practicing our invention and have described what we now consider to be its best embodiments. However, we desire to have it understood that, within the scope of the appended claims, the invention may be practiced otherwise than as specifically described.

We claim:
1. A method for producing calcium superoxide,

$$Ca(O_2)_2$$

which comprises reacting a calcium halide with a superoxide selected from the group consisting of alkali metal superoxides and tetra(lower alkyl)ammonium superoxides and recovering the calcium superoxide thus formed.

2. A method in accordance with claim 1 in which the calcium halide and the superoxide are abrasively mixed.

3. A method in accordance with claim 1 in which the calcium halide is calcium chloride and the superoxide is potassium superoxide.

4. A method in accordance with claim 1 in which the calcium halide is calcium chloride and the superoxide is sodium superoxide.

5. A method in accordance with claim 1 in which the calcium halide is calcium chloride and the superoxide is tetramethylammonium superoxide.

6. A method in accordance with claim 1 in which the calcium halide is calcium bromide and the superoxide is potassium superoxide.

7. A method in accordance with claim 1 in which the calcium halide is calcium bromide and the superoxide is sodium superoxide.

8. A method in accordance with claim 1 in which the calcium halide is calcium bromide and the superoxide is tetramethylammonium superoxide.

References Cited in the file of this patent
UNITED STATES PATENTS
2,648,596    Schechter _____ Aug. 11, 1953

OTHER REFERENCES
Mellor: "A Comprehensive Treatise on Inorganic and Theoretical Chemistry," vol. 3, 1923, page 668, Longmans, Green and Co., New York.